Sept. 28, 1965   B. B. SCHIERBEEK   3,208,558
MAGNETIC INDEXING DEVICE FOR WEIGHING SCALES
Filed Aug. 20, 1962   2 Sheets-Sheet 1

INVENTOR:
BEREND B. SCHIERBEEK
BY

Sept. 28, 1965　　　B. B. SCHIERBEEK　　　3,208,558
MAGNETIC INDEXING DEVICE FOR WEIGHING SCALES
Filed Aug. 20, 1962　　　　　　　　　　　2 Sheets-Sheet 2

INVENTOR:
BEREND B. SCHIERBEEK
BY
Marshall, Johnston, Cook & Root

United States Patent Office

3,208,558
Patented Sept. 28, 1965

3,208,558
MAGNETIC INDEXING DEVICE FOR
WEIGHING SCALES
Berend B. Schierbeek, Leidschendam, Netherlands, assignor to Maatschappij van Berkel's Patent N.V., Rotterdam, Netherlands, a limited-liability company of the Netherlands
Filed Aug. 20, 1962, Ser. No. 217,838
Claims priority, application Netherlands, Aug. 21, 1961, 268,433
3 Claims. (Cl. 188—158)

The invention relates to a selector mechanism for weighing scales provided with means for displaying computed prices. To enlarge the possible range of prices per pound a price viewing device for the prices is employed that is usually adjustable, so that it can be adjusted according to the desired price per pound in the correct price column. Depending on the weight on the platform of the scale and the conforming position of the pendulum, the viewing device will enlarge and project a part of the abovementioned price column.

It is well known to adjust or to set the viewing device along the different price columns by means of push buttons or levers, as for example used on cash registers or by means of turning knobs, or drums, which can make one or more revolutions for the whole price range.

This kind of price setting mechanism with a turnable knob needs, especially when there is a great optical enlargement, a ratchet device, to be used for accurately adjusting the viewing device in the correct position. The error in this positioning may not be large as such an error would lead to display of a part of the desired price column together with a part of the adjacent column, which is extremely confusing.

The invention relates therefore to a price setting device, for scales with price projection wherein a shaft with a knob thereon is employed to displace the price viewing device and wherein an incorrect setting of the viewing device is avoided. The mechanism is substantially frictionless, noiseless, and workable without the use of any special device to lift a ratchet or pawl. By using a flywheel on the shaft the viewing device is easily and quickly movable for coarse setting and thereafter fine-adjustment is made by the device according to our invention.

This is achieved by a setting device which consists of a magnetizable part having circumferentially arranged teeth which cooperate with a permanent magnetic part having corresponding teeth, fixed to a stationary frame of the scale. These parts are so designed that one or more teeth of one part are always opposite to one or more teeth of the other part. As both parts are magnetic the mechanism tends to position the teeth of one part opposite to the teeth of the other part, thereby positioning the viewing device exactly in front of a price-column.

The invention is further explained and some examples are given in the following drawings.

Figure 1:
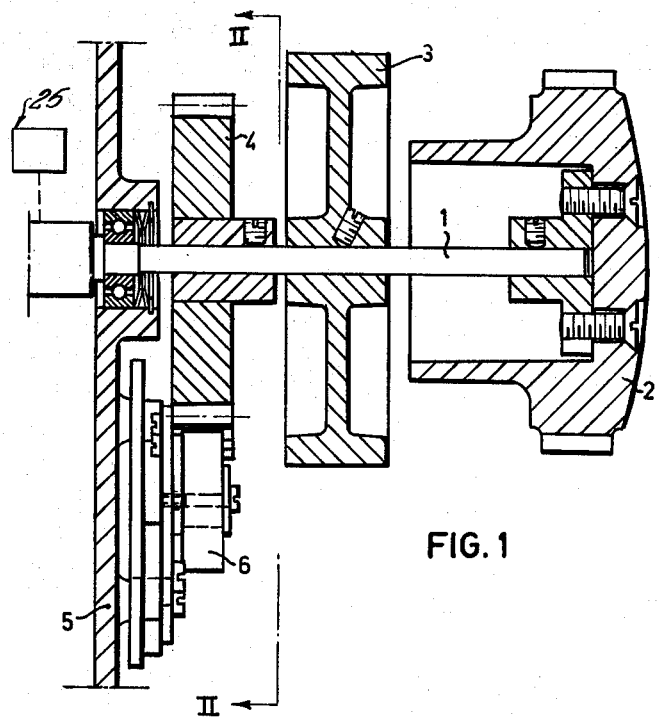
FIG. 1 is a longitudinal sectional view of the mechanism embodying the present invention.
Figure 2:
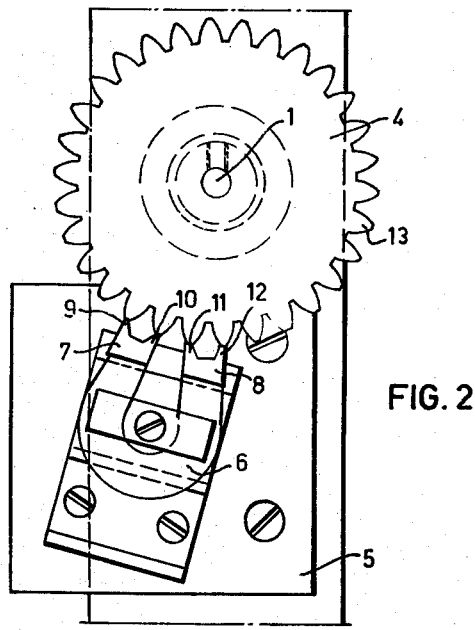
FIG. 2 is an elevational view taken along line II—II of FIG. 1, showing the shaft in section.

The setting device in FIGS. 1 and 2 includes a shaft 1, which when rotated moves a viewing device 25 along the different columns for projecting the prices. A knob 2 and a flywheel 3 are fixed along the shaft 1. A gear 4 of magnetic material is also fixed on the shaft 1 and is provided with teeth which move along a horse-shoe magnet 6. The magnet 6 is fixed to the frame 5 and provided with two poleshoes 7 and 8. Teeth 9, 10 and 11, 12 are defined by the poleshoes 7 and 8, each of which is a very short distance from the teeth 13 of the gear 4. The pitch of the teeth 9 and 10, and 11 and 12 is the same as the pitch of teeth 13 on the gear 4.

By turning or rotating the knob 2, the flywheel will move the viewing device 25 quickly along the price columns, without any obstruction from the magnetic ratchet device of the gear 4 and the magnet 6, until the wanted price column is reached. The knob is then braked, and the magnetic forces of the magnet 6 cause the teeth 13 to position themselves opposite to the teeth 9, 10 and 11, 12 so that the viewing device is properly positioned for a desired price column.

Because of the magnetic force, the teeth of the gear 4 will never position themselves between the teeth of the magnet 6.

Figure 3:
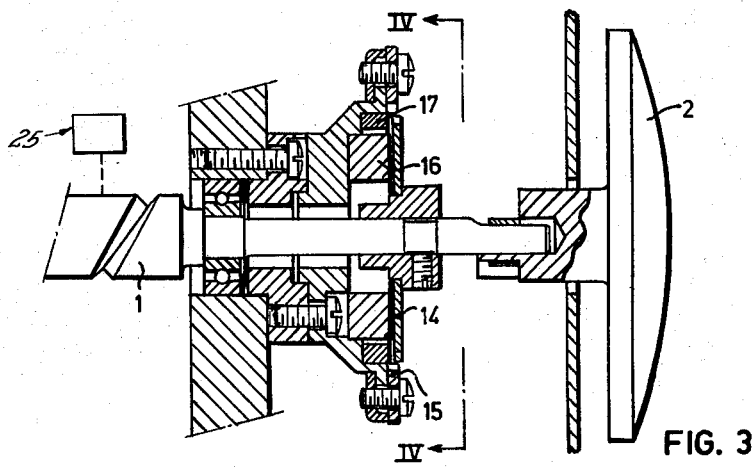
FIG. 3 is a longitudinal sectional view of a modified mechanism embodying the present invention.
Figure 4:
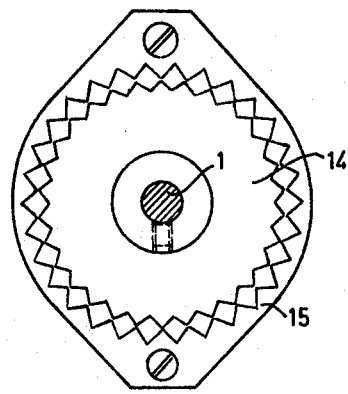
FIG. 4 is an elevational view taken along line IV—IV of FIG. 3 showing the shaft in section.

FIGS. 3 and 4 show a modification wherein the shaft 1 is driven by the knob 2, and a disc 14 of magnetic material with external teeth is fixed on this shaft. The disc 14 rotates or turns within a ring 15 of magnetic material which has internal teeth and is fixed to the frame 5, together with a permanent magnet 16. The teeth of the parts 14 and 15 are sharply pointed in order to impart a sufficient directing torque. A ring 17 is made from nonmagnetic material, and employed to avoid short-circuit of the magnetic force. The knob has the function of the flywheel.

This design has the advantage of its compactness.

Figure 5:
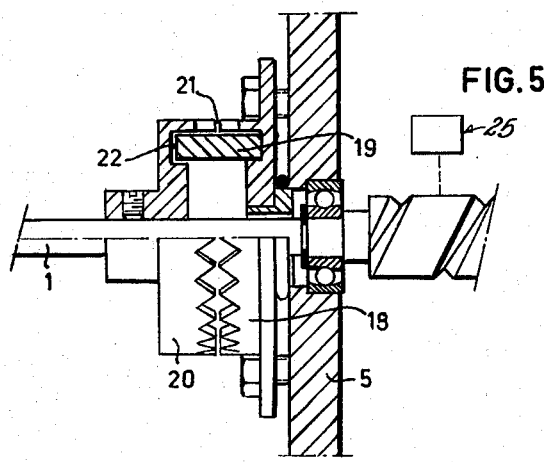
FIG. 5 shows a further embodiment of the mechanism embodying the present invention.

Finally, FIG. 5 shows an embodiment wherein a magnetic teethed ring 18 and a permanent magnet 19 are fixed on the frame 5. A teethed ring 20 is fixed on the shaft 1. Between the teeth of the parts 18 and 20, only a small air gap 21 is provided and a small air gap 22 is provided between the magnet 19 and ring 20. The gaps must be as small as possible to avoid obstruction of the magnetic force lines.

I claim:

1. In a weighing scale having a price viewing device for projecting price information, means adapted for adjusting the position of the viewing device including a frame, a shaft rotatable in said frame and adapted to be coupled to said device, a magnetically permeable disc-shaped member secured to said shaft and rotatable therewith, said disc-shaped member having a plurality of circumferentially arranged equally spaced teeth on its periphery, a magnetically permeable closed ring member secured to said frame and having a plurality of circumferentially arranged equally spaced teeth arranged in close proximity to the teeth of said disc-shaped member, the number of teeth on said disc-shaped member being equal to the number of teeth on said ring, and a permanent magnet secured to said frame for creating a magnetic circuit between the teeth of said members thereby urging said teeth to align with each other.

2. The weighing scale of claim 1, and a weighted wheel secured to and rotatable with said shaft.

3. In a weighing scale having a price viewing device for projecting price information, means adapted for adjusting the position of the viewing device including a frame, a shaft rotatable in said frame and adapted to be coupled to said device, a first magnetically permeable cylindrical member secured to said frame, said first member being open on one end and provided with a plurality of equally spaced teeth, a second magnetically permeable cylindrical member secured to said shaft, said second member being open on one end and facing said first member and having a plurality of equally spaced teeth of the same number as on the first member, and a permanent magnet secured to said frame for creating a magnetic circuit between the teeth of said members thereby urging said teeth to align with each other.

References Cited by the Examiner

UNITED STATES PATENTS

| | | | |
|---|---|---|---|
| 1,210,204 | 12/16 | Reeves | 177—166 |
| 1,318,511 | 10/19 | Thomas | 177—166 |
| 3,092,314 | 6/63 | Kuhnle | 235—61 |

ARTHUR L. LA POINT, *Primary Examiner.*